(12) United States Patent
Herter et al.

(10) Patent No.: US 7,908,290 B2
(45) Date of Patent: Mar. 15, 2011

(54) APPLICATION DEVELOPMENT PERFORMED INDEPENDENT OF SYSTEM LANDSCAPE

(75) Inventors: Klaus Herter, Leimen (DE); Wolfgang Kalthoff, Bad Schoenborn (DE); Jens Staeck, Sandhausen (DE)

(73) Assignee: SAP AG, Walldorf (DE)

( * ) Notice: Subject to any disclaimer, the term of this patent is extended or adjusted under 35 U.S.C. 154(b) by 1616 days.

(21) Appl. No.: 11/020,011

(22) Filed: Dec. 20, 2004

(65) Prior Publication Data

US 2006/0136873 A1  Jun. 22, 2006

(51) Int. Cl.
*G06F 17/30* (2006.01)
(52) U.S. Cl. .................. 707/770; 709/203; 711/114
(58) Field of Classification Search .................. 707/10, 707/103 R, 769, 770; 709/328, 203; 717/114, 717/146; 711/114
See application file for complete search history.

(56) References Cited

U.S. PATENT DOCUMENTS

| | | | | |
|---|---|---|---|---|
| 6,002,854 | A | * | 12/1999 | Lynch et al. .................. 703/1 |
| 6,006,230 | A | * | 12/1999 | Ludwig et al. .................. 707/10 |
| 2003/0167358 | A1 | * | 9/2003 | Marvin et al. .................. 709/328 |
| 2006/0064671 | A1 | | 3/2006 | Herter et al. |

FOREIGN PATENT DOCUMENTS

EP  0913967 A2 * 5/1999

OTHER PUBLICATIONS

Haag, Albert, "Sales Configuration in Business Processes", IEEE Intelligent Systems, Jul./Aug. 1998, vol. 13, Issue 4, pp. 78-85.*

* cited by examiner

*Primary Examiner* — Shahid A Alam
(74) *Attorney, Agent, or Firm* — Schwegman, Lundberg & Woessner, P.A.

(57) ABSTRACT

Systems and techniques for application development performed independently of system landscape. In one general aspect, the invention provides a computer-implemented method that includes receiving, from a registry for two or more repositories, information describing an object definition of a first repository of the two or more repositories. The first repository is a collection of object definitions associated with a first application. The method includes using the information to generate a proxy for the object definition and storing the proxy in a second repository of the two or more repositories. The proxy is a reference to the object definition of the first repository. The second repository is a collection of definitions associated with a second application. Wherein the proxy is available to the second application for use as though the proxy is an object definition of the second repository.

22 Claims, 4 Drawing Sheets

APPLICATION DEVELOPMENT PERFORMED INDEPENDENT OF SYSTEM LANDSCAPE

BACKGROUND

The present specification relates to data processing and data objects.

To manage its operations, an enterprise can typically include multiple computing systems, for example, one for customer relationship management, one for product lifecycle management, one for supply chain management, and one for manufacturing. Each of these systems can include one or more applications, each of which is typically configured to perform one or more tasks. The systems of an enterprise may be implemented with different technology stacks, especially when they are purchased from different vendors. A technology stack includes layers of software, for example, applications, application program interfaces, and protocols. Examples of technology stack include, a JAVA stack, a C++ stack, and an ABAP stack. Moreover, one or more of the systems may implement a business process that involves a computing system of another enterprise.

The applications of one of the above-described systems can process, store, and provide data, which can include, by way of example, data objects and business objects. Data objects are generally elements for information storage in object-oriented computing systems. Data objects can describe the characteristics of an item using a series of data fields that, for example, can correspond to described characteristics. One example of a data object is a business object, which is typically used in data processing to describe the characteristics of an item or a process related to the operations of an enterprise. A business object can represent, by way of example, a document, a sales order, a product, a piece of manufacturing equipment, an employee, and even the enterprise itself.

The data can be of a particular type. There are simple data types and complex data types. Examples of data types that are simple include but are not limited to an alphanumeric string, an integer, and a floating point decimal number. Examples of data types that are complex include but are not limited to attributes of a business object and the business object itself.

In conventional systems, an application of a system is usually associated with one or more repositories that are local to the system, and a repository local to the system can be associated with more than one application of the system. A repository is generally a collection of object definitions, for example, definitions for data types, object properties and behavior, services associated with an object, and properties of software entities, that are used by the one or more applications with which the repository is associated. An application needs the definitions stored in the local repository and usually cannot function properly without them. Consequently, at design time, a stage when the application is being designed and built, a developer must usually be aware of the local repositories that are expected to be available to the application and include references to these repositories. Furthermore, when there are more than one local repository, the developer must usually specify which definitions are to be included in which local repository.

An application can also be associated with a repository that is not local to the system in which the application operates. Such a repository is referred to in the instant specification as an external repository. In this case, the developer must usually, at design time, be aware of this requirement and include, in the code of the application, a reference to the external repository. Furthermore, when the system in which the external repository is located is implemented with a technology stack that is different from the technology stack of the application, the developer must also be aware of the different requirements of the two technology stacks and include, in the code of the application, instructions for accessing information from the technology stack of the local repository and the technology stack of the external repository. Awareness of the landscape in which the application will operate is, thus, necessary at design time.

SUMMARY

The present invention provides methods and apparatus, including computer program products, for providing application development independent of system landscape. A registry for a collection of repositories includes information describing object definitions of the repositories. At design time, the information in the registry can be used to create a repository for the application being developed, including generating proxies of definitions for the repository, without consideration of the technology stacks used to implement the repositories of the collection. At configuration time, the application and the proxy are installed and configured at a customer site. At run time, the application can use the proxies as if they were actual object definitions stored in the repository.

In one general aspect, the invention features a computer-implemented method that includes receiving, from a registry for two or more repositories, information describing an object definition of a first repository of the two or more repositories. A repository is a collection of object definitions associated with an application. The first repository is a collection of object definitions associated with a first application. The registry includes information describing object definitions of the two or more repositories. The method includes using the information to generate a proxy for the object definition and storing the proxy in a second repository of the two or more repositories. The proxy is a reference to the object definition of the first repository. The second repository is a collection of definitions associated with a second application. Wherein the proxy is available to the second application for use as though the proxy is an object definition of the second repository. Whereby there needs to be only one of the object definition stored in the two or more repositories.

In another general aspect, the invention features a computer program product, tangibly stored on machine-readable medium, that includes instructions operable to cause a processor to receive, from a registry for two or more repositories, information describing an object definition of a first repository of the two or more repositories. A repository is a collection of object definitions associated with an application. The first repository is a collection of object definitions associated with a first application. The registry includes information describing object definitions of the two or more repositories. The product further includes instructions to use the information to generate a proxy for the object definition and store the proxy in a second repository of the two or more repositories. The proxy is a reference to the object definition of the first repository. The second repository is a collection of definitions associated with a second application. Wherein the proxy is available to the second application for use as though the proxy is an object definition of the second repository. Whereby there needs to be only one instance of the object definition stored in the two or more repositories.

The invention can be implemented to realize one or more of the following advantages. To an application accessing a repository, proxies in accordance with the invention appear and behave as though they are actual definitions stored in the repository. The proxies can reference actual definitions stored at another repository, regardless of the technology stack of the system in which the other repository is implemented. The proxies can reference other proxies. There is no need to associate, at design time, the application with repositories other than its local one. References to other repositories need not be programmed into the application. Because the mechanism for referencing external repositories is included in proxies and not the application being developed, the application can be developed and built without consideration to technology stacks other than the one in which the application will operate. A developer, thus, need not be aware of the system landscape at design time to develop the application, and, at design time, the application can be designed and built independently of the system landscape in which it will operate. The application can be adapted, at configuration time, when the application is installed and configured usually at a customer site, to run on any system landscape. In a figurative sense, the invention decouples application development from runtime environment and not only simplifies development but also provides added flexibility. Only one actual object definition is required to be stored in a collection of repositories and memory space can be conserved. The details of one or more implementations of the invention are set forth in the accompanying drawings and the description below. Other features, objects, and advantages of the invention will be apparent from the description and drawings, and from the claims.

DESCRIPTION OF DRAWINGS

Like reference symbols in the various drawings indicate like elements.

DETAILED DESCRIPTION

Figure 1:
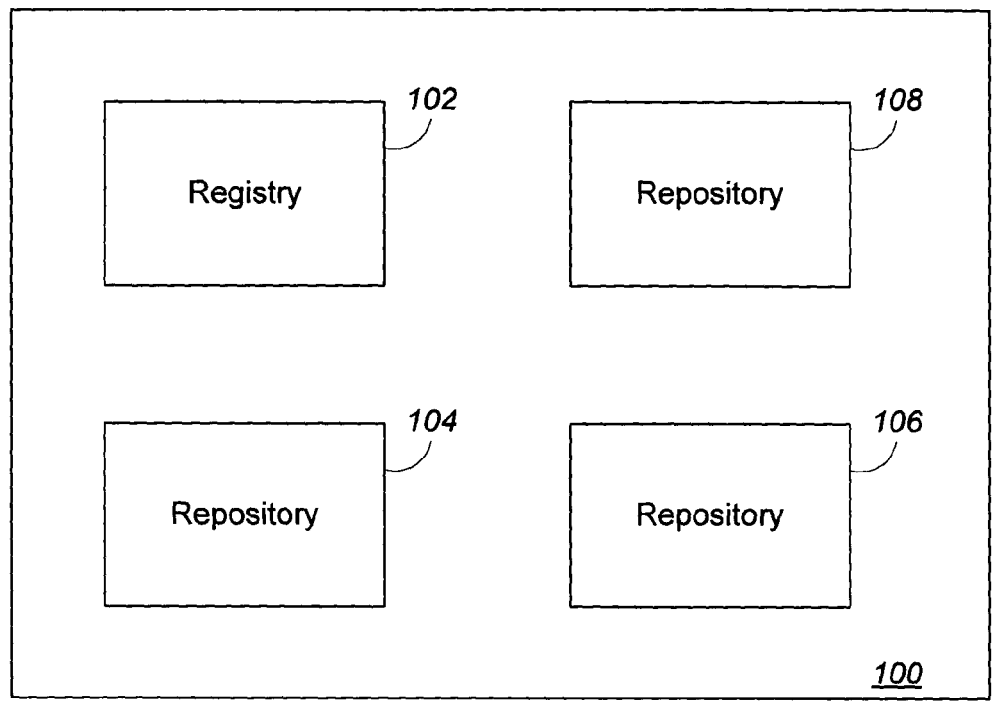
FIG. 1 shows a collection of repositories in which aspects of the invention can be implemented.

FIG. 1 shows a collection of repositories 100 in which aspects-of the invention can be implemented. The collection 100 includes a registry 102 and repositories 104, 106, and 108, which can be located in the same system or in different systems, use the same technology stack or different technology stacks, and be owned by the same enterprise or different enterprises. Alternatively, the collection 100 can include fewer or more repositories.

The object definitions stored in the repositories can be for any type of data objects, including the above described ones and, furthermore, composite objects, which are formed from building blocks. An example of a composite object is a business object that represents a customer. The business object can be defined as a collections of other data objects, each of which represents some characteristic of the customer, for example, the customer name, address, and phone number. Suitable composite objects are further described in commonly owned U.S. patent application Ser. No. 10/945,558, filed on Sep. 20, 2004, which application is hereby incorporated by reference in its entirety.

The registry includes information that describe the object definitions of the repositories in the collection. For each object definition, the information specifies how to reference and access the object definition. The information can specify, for example, the name and network location of the repository in which the actual object definition is stored and, furthermore, an identification of the object definition. Optionally, the information can describe existing proxies associated with the object definition. In implementations where the repositories use data types that do not comply with a standard, the information includes mapping information for mapping one data type to another. In implementations where the repositories use data type that are in accordance with a standard, for example, the UN/CEFACT standard, there is no need for the information to include the described mapping information. In one implementation, the registry is implemented by SAP XI, available from SAP AG, of Walldorf Germany.

The registry 102 can be implemented so that the information it contains can be presented in any one of the different technology stacks used to implement the repositories of the collection. The registry 102 can include or have use of an engine that provides an interface for receiving update information, for example, information specifying that repository 108 has a new object definition and information describing the new object definition. Updates can be effected either continuously, in response to changes in the repositories, or periodically in batches.

The registry can include or have use of an engine that provides an interface for searching an index of the information about object definitions of the repositories. There can be multiple indices for information about the object definitions.

Optionally, the collections can include different versions of a registry. In this case, proxies can include information specifying the version of the registry in which a referenced object definition is stored. Note that proxies referencing object definitions in older versions of the registry need not be changed when a new version of the repository is implemented. Versioning information can be included in the registry 102.

Figure 2:
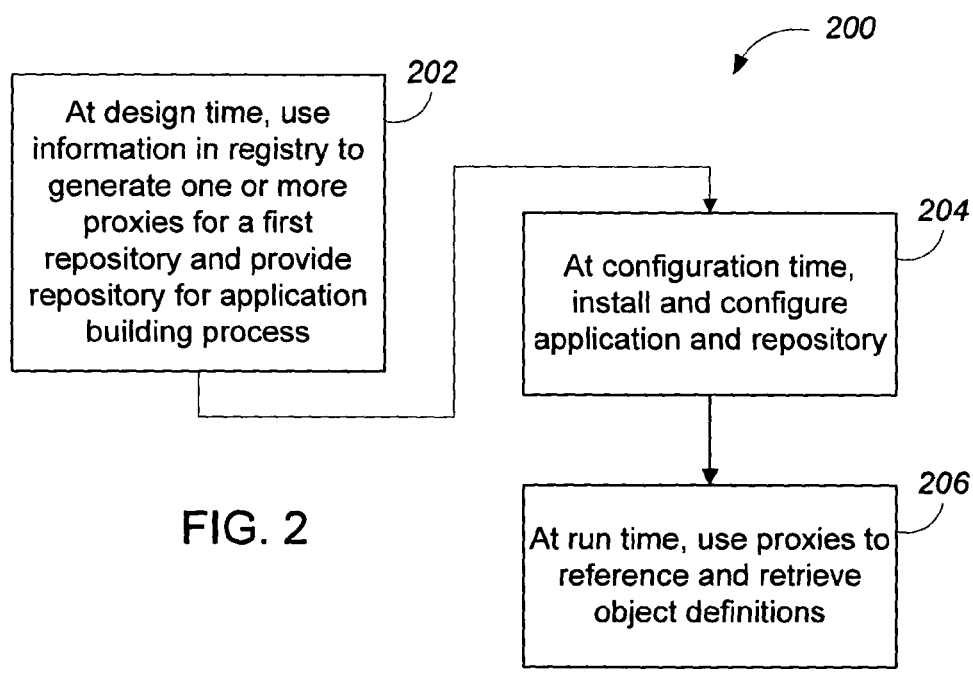
FIG. 2 shows a method for application development performed independently of system landscape.

FIG. 2 shows a method 200 for application development using the above-described collection of repositories. At design time, information from the registry 102 is used to generate one or more proxies for a first repository (step 202). The first repository is a new repository to be added to the collection of repositories. Alternatively, the first repository can be one of the existing repositories 104, 106, and 108.

A proxy is generated when an object definition needed by the application already exists in the collection of repositories, as indicated by the registry 102. A proxy is also generated when part of an object definition needed by the application already exists, as indicated by the registry 102. The proxy, in this case, simply acts as a local building block of a local object definition that is a composite object, as described in the above-referenced U.S. patent application.

Each of the one or more proxies is generally a reference to either the location of the actual object definition or to another proxy that eventually references the actual object definition. Each of the one or more proxies implements a referencing mechanism that is independent of technology stack. That is, the referencing mechanism can operable with different technology stacks, including the above-mentioned JAVA, C++, and ABAP stacks. Such a mechanism can be provided, for example, by Web Services of SAP Web Application Server, available from SAP AG. Alternatively, other technology-stack independent mechanisms can be used. The proxy appears and behaves, to a calling application, to be local object definition, i.e., stored in the first repository, except that it cannot be changed. Any change, however, can be effected at the repository where the actual object definitions is located. The one or more proxies generated are stored in memory.

At configuration time, the application and the one or more proxies are installed and configured at a customer site (step 204). The one or more proxies are installed in the first repository. The registry 102 (FIG. 1) is updated accordingly to include information describing the new proxies.

At run time, when the application is executed, the application can use the one or more proxies as though they are object definitions stored in the first repository (step 206). When the application requests an object definition in the first repository and the requested object definition is actually a proxy, the actual object definitions is retrieved by using the above-described referencing mechanism and the information included in the proxy. The referencing mechanism allows the request to be passed on to the repository where the actual object definition is stored, which repository will be referred to as the second repository. The requested object definition is then retrieved and passed back to the first repository, which provides the object definition to the calling application as if the object definition were local. The described process, in a sense, is a delegation, from the first repository to the second repository, of the task requested by the calling application. The delegation is unambiguous because of the information included in the proxy.

Figure 3:
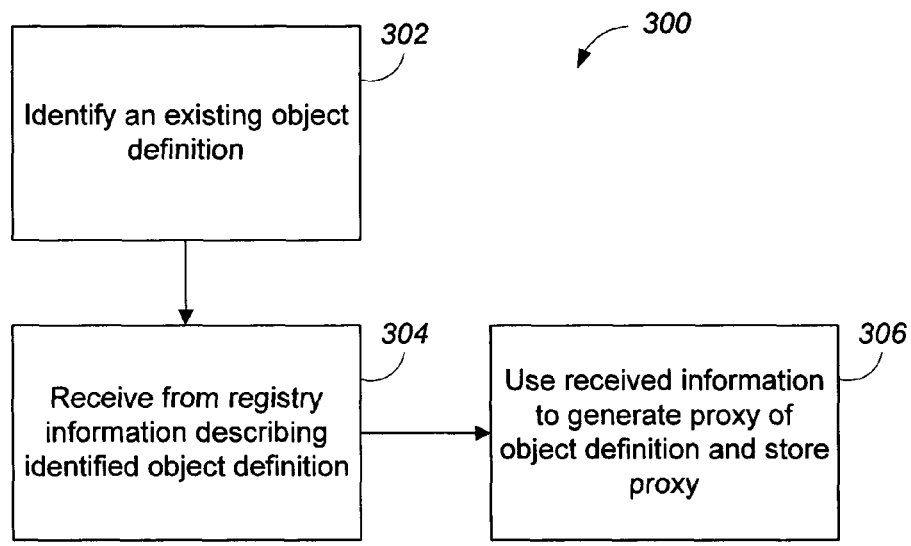
FIG. 3 shows a method for generating a proxy that includes a mechanism for referencing an external repository.

FIG. 3 shows a method 300 for generating a proxy in accordance with the invention. An existing object definition is identified (step 302). The identified object definition is one that is needed by the application being developed and is indicated, for example, by the repository 102 (FIG. 1), as already existing in the collection of repositories. Information about the identified object definition is received from the registry (step 304). The information retrieved includes the identification and network location of the repository where the actual object definition is stored. The information retrieved can include information specifying how to access object definitions in the repository where the actual object definition is stored. The retrieved information is used to generate a proxy (step 304). The proxy is generated so that, to a calling application, it appears and behaves as a local object definition. The proxy includes the retrieved information, thus, specifying without ambiguity the identity and network location of the repository where the actual object definition is stored. The proxy is stored in memory (step 306).

Figure 4:
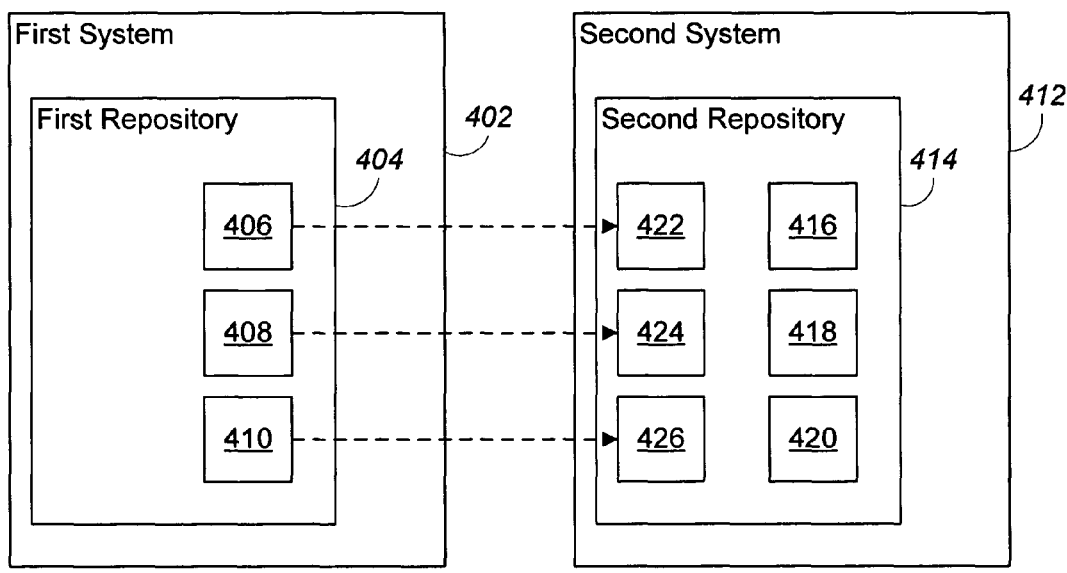
FIG. 4 is a block diagram of two systems and illustrates a proxy reference established at configuration time.

FIG. 4 is a block diagram of two systems and provides an example of proxy references established at configuration time. As shown, a first system 402 includes a first repository 404, which includes object definitions 406, 408, and 410. The first system 402 is an enterprise resource planning (ERP) system, and its applications are configured to perform ERP tasks. The object definitions in the first repository 404 are for product attributes relating to ERP. The object definitions 406, 408, and 410 are identified as base-unit_of measure, purchasing_group, and lot_size, respectively.

A second system 412 includes a second repository 414. The second system is a catalog system, which applications are configured to structure and publish product information. The object definitions in the first repository 414 are for any and all of product attributes, including those relating to ERP. The second repository 414 includes object definitions 416, 418, and 420, which are identified as generic_ingredients, country_of_origin, and canceled_date, respectively. By including proxies 422, 424, and 426, which are identified as system_1.base-unit_of measure, system_1.purchasing-group, and system_1.lot_size, respectively, the second repository 414 also appears, to a calling application, to include the object definitions 406, 408, and 410.

The publishing of product data, for example, in web or print media, is done by the applications of the second system 412 programming against the second repository 414. It is possible to seamlessly reuse, for example, the repository object component1.base unit_of_measure in conjunction with local objects of the second repository 414 like canceled_date.

Figure 5:
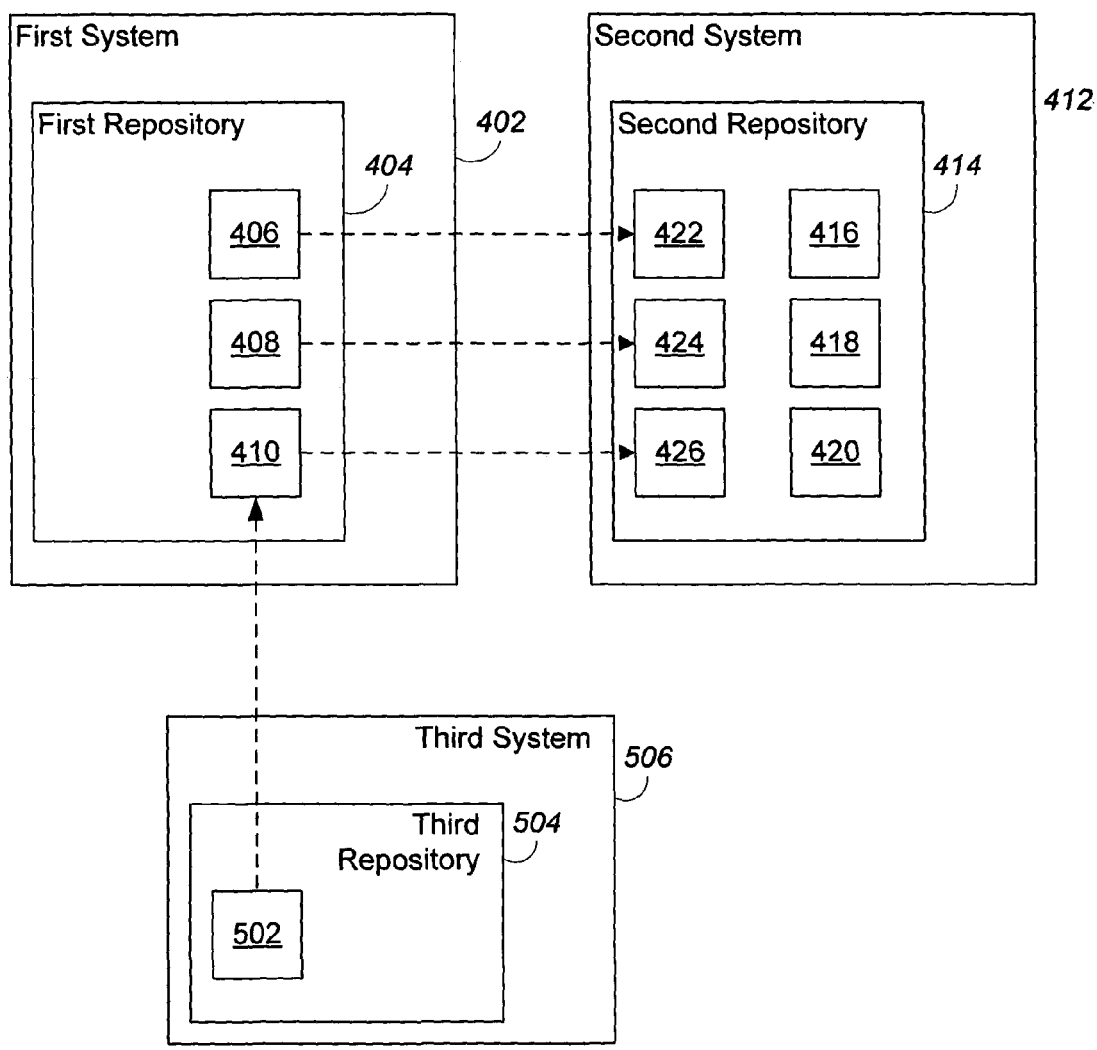
FIG. 5 is a block diagram of three systems and illustrates a proxy reference to another proxy.

FIG. 5 is a block diagram of three systems and provides an example of a proxy that 1 5 references another proxy. The first and second systems are those described above in reference to FIG. 4, except that the object definition 410 is actually a proxy that references the object definition 502, which is stored in a third repository 504 of a third system 506. The proxy 426 references the proxy 410, which references the object definition 502. Alternatively, the proxy 426 can directly reference the object definition 502. In either case, the object definition 502 is available to an application of the second system 412 as if the object definition 502 were local in the repository 414.

Note that if one of the repositories described above allows the generation of composite objects by using building blocks as described in the above-reference U.S. patent application, the composite object can be built from a combination of objects actually stored at the repository and proxies stored at the repository. In essence, the object definitions of all other repositories are now available for building the composite object.

Figure 6:
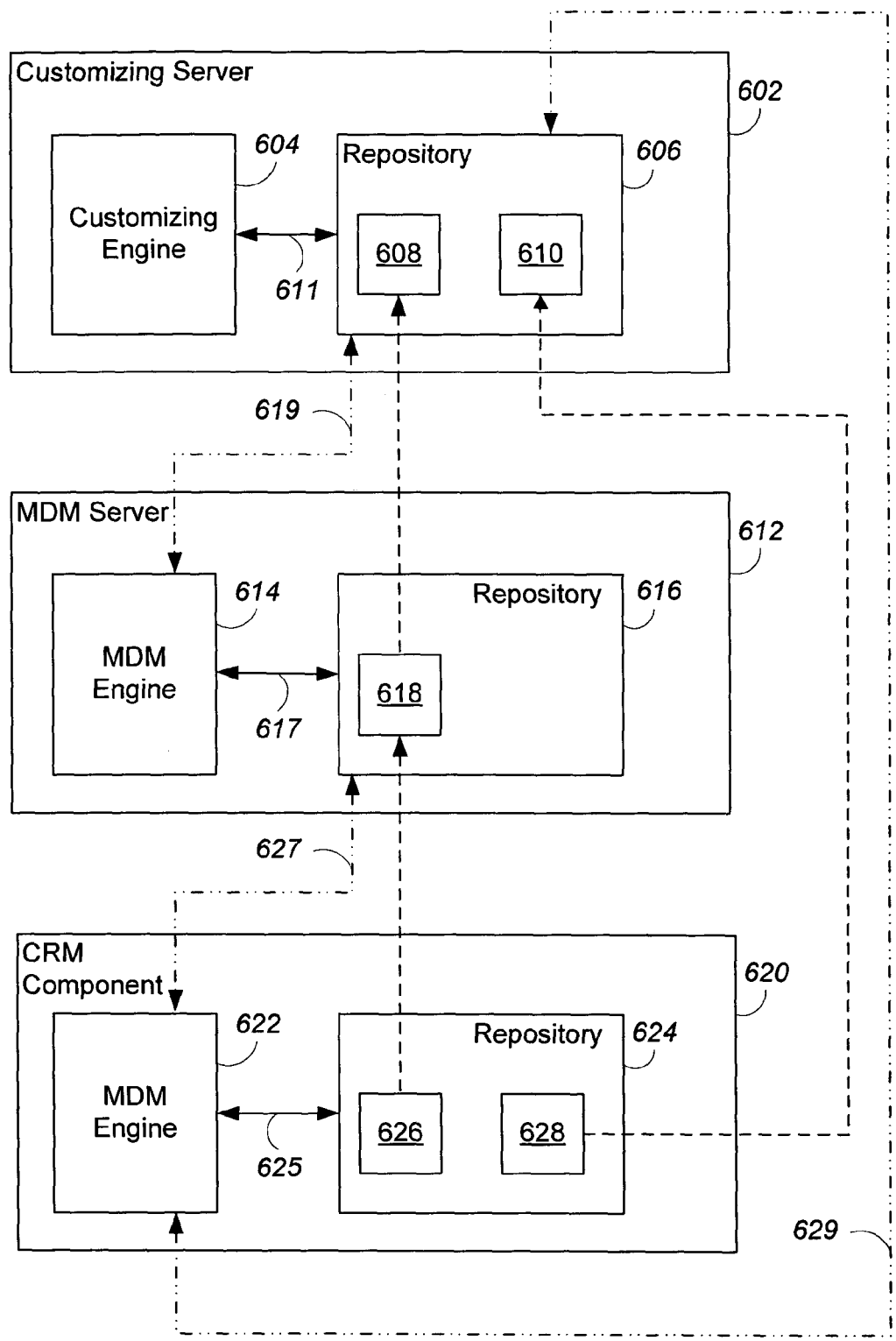
FIG. 6 is a block diagram of an implementation in which there are three repositories.

FIG. 6 shows a block diagram of an implementation in which there are three repositories. As shown, a customizing server 602 includes a customizing engine 604 and a repository 606. The customizing server 602 is configured to tailor data, for example, for a particular manufacturing plant, a particular customer, or a particular geographic location. At design time, a reference (represented by a line 611) is included in the customizing engine 604 so that it can access objects in the repository 606, which are object definitions 608 and 610. No references to other repositories are included in the customizing engine 604.

A master data management (MDM) server 612 includes an MDM engine 614 and a repository 616. The MDM engine 614 is configured to maintain and provide master data. At design time, a reference (represented by a line 617) is included in the MDM engine 614 so that it can access the object in the repository 616, which is a proxy 618 that references object definition 608. No references to other repositories, for example, a hypothetical reference represented by line 619, are included in the MDM engine 614. The object definition 608 is, nevertheless, available to the MDM engine 614 as if the object definition 608 were actually stored in the repository 616, and master data can be modeled using the object definition 608 as if it were local.

A customer relationship management (CRM) component 620 includes a CRM application 622 and a repository 624. The CRM application 622 is configured to perform CRM related tasks. The CRM component is only one part of and does not constitute an entire computing system. At design time, a reference (represented by a line 625) is included in the CRM application 622 so that the application can access objects in the repository 624, which are a proxy 626 that references proxy 618 and a proxy 628 that references object definition 610. No references to other repositories, for example, hypothetical references represented by lines 627 and 629, are included in the CRM application 622. The object definition 608 and 610 are, nevertheless, available to the CRM application 622 as if they were actually stored in the repository 624. At design time, the CRM application 622 and its user interfaces, for example, can be built using the object definitions 608 and 610 as if they were in the repository 624.

The invention can be implemented in digital electronic circuitry, or in computer hardware, firmware, software, or in combinations of them. The invention can be implemented as a computer program product, i.e., a computer program tangibly embodied in an information carrier, for example, in a machine-readable storage device or in a propagated signal, for execution by, or to control the operation of, data processing apparatus, for example, a programmable processor, a computer, or multiple computers. A computer program can be written in any form of programming language, including compiled or interpreted languages, and it can be deployed in any form, including as a stand-alone program or as a module, component, subroutine, or other unit suitable for use in a computing environment. A computer program can be deployed to be executed on one computer or on multiple computers at one site or distributed across multiple sites and interconnected by a communication network.

Method steps of the invention can be performed by one or more programmable processors executing a computer program to perform functions of the invention by operating on input data and generating output. Method steps can also be performed by, and apparatus of the invention can be implemented as, special purpose logic circuitry, for example, an FPGA (field programmable gate array) or an ASIC (application-specific integrated circuit).

Processors suitable for the execution of a computer program include, by way of example, both general and special purpose microprocessors, and any one or more processors of any kind of digital computer. Generally, a processor will receive instructions and data from a read-only memory or a random access memory or both. The essential elements of a computer are a processor for executing instructions and one or more memory devices for storing instructions and data. Generally, a computer will also include, or be operatively coupled to receive data from or transfer data to, or both, one or more mass storage devices for storing data, for example, magnetic, magneto-optical disks, or optical disks. Information carriers suitable for embodying computer program instructions and data include all forms of non-volatile memory, including by way of example semiconductor memory devices, for example, EPROM, EEPROM, and flash memory devices; magnetic disks such as internal hard disks and removable disks; magneto-optical disks; and CD-ROM and DVD-ROM disks. The processor and the memory can be supplemented by, or incorporated in special purpose logic circuitry.

To provide for interaction with a user, the invention can be implemented on a computer having a display device such as a CRT (cathode ray tube) or LCD (liquid crystal display) monitor for displaying information to the user and a keyboard and a pointing device such as a mouse or a trackball by which the user can provide input to the computer. Other kinds of devices can be used to provide for interaction with a user as well; for example, feedback provided to the user can be any form of sensory feedback, such as visual feedback, auditory feedback, or tactile feedback; and input from the user can be received in any form, including acoustic, speech, or tactile input.

The invention can be implemented in a computing system that includes a back-end component, for example, as a data server, or that includes a middleware component, for example, an application server, or that includes a front-end component, for example, a client computer having a graphical user interface or a Web browser through which a user can interact with an implementation of the invention, or any combination of such back-end, middleware, or front-end components. The components of the system can be interconnected by any form or medium of digital data communication, for example, a communication network. Examples of communication networks include a local area network ("LAN"), a wide area network ("WAN"), and the Internet.

A number of implementations of the invention have been described. Nevertheless, it will be understood that various modifications may be made without departing from the spirit and scope of the invention. For example, process steps can be performed in different order. Information describing an object definition can be received from sources other than the described registry, for example, from a publication of the repository in which the object definition is actually stored. Accordingly, other implementations are within the scope of the following claims.

What is claimed is:

1. A computer-implemented method, comprising:
receiving, from a registry for two or more repositories, information describing an object definition of a first repository of the two or more repositories, a repository being a collection of object definitions associated with an application, the first repository being a collection of object definitions associated with a first application, the registry including information describing object definitions of the two or more repositories; and
using the information to generate a proxy for the object definition, the proxy being a reference to the object definition of the first repository, and storing the proxy in a second repository of the two or more repositories, the second repository being a collection of definitions associated with a second application, wherein the proxy is available to the second application for use as though the proxy is an object definition of the second repository, whereby there needs to be only one of the object definition stored in the two or more repositories.

2. The method of claim 1, wherein:
the first application is implemented by using a first programming language, and the second application is implemented by using a second programming language that is different from the first programming language.

3. The method of claim 1, wherein:
the first repository is part of a first enterprise system and the second repository is part of a second enterprise system that is different from the first enterprise system.

4. The method of claim 1, wherein:
the first repository is part of a first technology stack and the second repository is part of a second technology stack that is different from the first technology stack.

5. The method of claim 1, wherein:
object definitions of the first repository includes any combination of a definition for a data type, a definition for a data object, and a definition for a property of a software entity, and receiving information describing an object definition includes receiving information describing one of a definition for a data type, a definition for a data object, or a definition for a property of a software entity.

6. The method of claim 5, wherein:
the two or more repositories have only data types that comply with a standard, and generating the proxy does not required a mapping of data.

7. The method of claim 6, wherein:
the standard is UN/CEFACT.

8. The method of claim 5, wherein:
the two or more repositories include data types that do not comply with a standard, and generating includes a mapping of data.

9. The method of claim 5, wherein receiving information describing a data type includes:
   receiving one of a string, integer, float, or an attribute of a data object.

10. The method of claim 5, further comprising:
    associating the first object definition with the second object definition and generating an object definition that is a composite of the first and second object definitions, the generated object definition including information describing the association and being stored in the second repository.

11. The method of claim 1, wherein:
    the object definition of the first repository is a proxy that references an object definition of a third repository of the two or more repositories.

12. The method of claim 1, further comprising:
    in response to receiving, at the second repository, a request for the object definition of the first repository, using the proxy to retrieve the object definition from the first repository.

13. The method of claim 12, further comprising:
    using the proxy to provide the object definition to a source of the request, to which the object definition appears as though it is stored in the second repository.

14. A computer program product, tangibly stored on machine-readable medium, comprising instructions operable to cause a processor to:
    receive, from a registry for two or more repositories, information describing an object definition of a first repository of the two or more repositories, a repository being a collection of object definitions associated with an application, the first repository being a collection of object definitions associated with a first application, the registry including information describing object definitions of the two or more repositories; and
    use the information to generate a proxy for the object definition, the proxy being a reference to the object definition of the first repository, and storing the proxy in a second repository of the two or more repositories, the second repository being a collection of definitions associated with a second application, wherein the proxy is available to the second application for use as though the proxy is an object definition of the second repository, whereby there needs to be only one instance of the object definition stored in the two or more repositories.

15. The product of claim 14, wherein:
    the first application is implemented by using a first programming language, and the second application is implemented by using a second programming language that is different from the first programming language.

16. The product of claim 14, wherein:
    the first repository is part of a first technology stack and the second repository is part of a second technology stack that is different from the first technology stack.

17. The product of claim 14, wherein:
    object definitions of the first repository includes any combination of a definition for a data type, a definition for a data object, and a definition for a property of a software entity, and receiving information describing an object definition includes receiving information describing one of a definition for a data type, a definition for a data object, or a definition for a property of a software entity.

18. The product of claim 17, wherein:
    the two or more repositories have only data types that comply with a standard, and generating the proxy does not required a mapping of data.

19. The product of claim 17, wherein:
    the two or more repositories include data types that do not comply with a standard, and generating includes a mapping of data.

20. The product of claim 17, further comprising instructions to:
    associate the first object definition with the second object definition and generate an object definition that is a composite of the first and second object definitions, the generated object definition including information describing the association and being stored in the second repository.

21. The product of claim 14, wherein:
    the object definition of the first repository is a proxy that references an object definition of a third repository of the two or more repositories.

22. The product of claim 14, further comprising instructions to:
    in response to receiving, at the second repository, a request for the object definition of the first repository, use the proxy to retrieve the object definition from the first repository.

* * * * *